United States Patent
Dyer et al.

(10) Patent No.: US 6,442,596 B1
(45) Date of Patent: Aug. 27, 2002

(54) SHARED DATA VIEWS FOR LARGE-SCALE MULTIMODE ENVIRONMENTS

(75) Inventors: Douglas M. Dyer, Indialantic; David A. Boley, Melbourne Beach; Anthony P. Galluscio, Indialantic, all of FL (US)

(73) Assignee: Harris-Exigent, Inc., Melbourne, FL (US)

(*) Notice: Subject to any disclaimer, the term of this patent is extended or adjusted under 35 U.S.C. 154(b) by 0 days.

(21) Appl. No.: 09/376,621

(22) Filed: Aug. 18, 1999

(51) Int. Cl.[7] .............................................. G06F 15/16
(52) U.S. Cl. ...................................... 709/207; 709/217
(58) Field of Search ................................. 709/200, 201, 709/203, 205, 206, 207, 217, 218, 219, 227

(56) References Cited

U.S. PATENT DOCUMENTS

| | | | | |
|---|---|---|---|---|
| 6,073,011 A | * | 6/2000 | Horstein ..................... | 455/427 |
| 6,157,809 A | * | 12/2000 | Kambayashi ................. | 725/91 |
| 6,226,684 B1 | * | 5/2001 | Sung et al. .................. | 709/238 |
| 6,257,526 B1 | * | 7/2001 | Taormina et al. ......... | 244/158 R |

* cited by examiner

Primary Examiner—Moustafa M. Meky
(74) Attorney, Agent, or Firm—Akerman Senterfitt

(57) ABSTRACT

A method for distributing data for one or more controlled devices having defined subsystems which generate data. The method includes the steps of partitioning and labeling the data to establish a set of defined data views, so that each data view contains data for a predetermined set of the subsystems. The data is stored on a server node of a computer network and is subsequently broadcast over the network using multicast techniques. The broadcasted data contains a plurality of the data views from the server which are received by at least one client node via the network. The client node selectively processes a predetermined set of the data in accordance with the data views assigned to the client node and rejects all other data views.

16 Claims, 7 Drawing Sheets

| View | Device #1 Subsystem | Device #2 Subsystem | Device #3 Subsystem | Device #4 Subsystem |
|---|---|---|---|---|
| 1 | A | A | A | A |
| 2 | B | B | B | B |
| 3 | C | C | C | C |
| 4 | D | D | D | D |

*FIG. 3*

SHARED DATA VIEWS FOR LARGE-SCALE MULTIMODE ENVIRONMENTS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to computer data distribution systems, and particularly to distribution of device data generated by multiple subsystems in a constellation.

2. Description of the Related Art

Satellite ground stations today are required to process and distribute more data from even more space vehicles (SVs) than ever before. In the past, a ground station would have a single SV in view at any given point in time or in the case of a station supporting geosynchronous systems, separate hardware systems dedicated to a single SV would perform the isolated processing to determine vehicle state. Today satellite constellations containing up to 80 SVs are being supported by ground stations consisting of up to 50 workstations sharing all the data all the time. This data reflects the state of the individual vehicles, state of the constellation, and state of the ground hardware and software.

Ground station personnel from their workstations request, process and view the data in which they are interested. Operation's Shift Leads view constellation status, operator-SV assignments, and ground station status. Operators view overall SV state including power, thermal, attitude, payload and other systems for each individual satellite. SV engineers wish only to view the data pertaining to the satellite subsystem they are responsible for (i.e. power, thermal or payload systems). Operators or SV engineers may wish to view the health and state of a single SV or many SVs.

In the case of SV engineers, they will typically need to view and trend specific subsystem measurements common to all SVs in a cooperating SV constellation. In this case, it is not advisable to require a SV engineer's workstation to ingest and process all data from all SVs in order to trend or view a handful of measurands across all SVs in the constellation. One approach would be to implement a publish/subscribe approach where by client applications "subscribe" for selected data from the server (publisher). From experience it has been seen that this solution is not scalable when many clients subscribe to the same data within the system. The server (or publishing application) can "back-up" due to clients not accepting data in a timely fashion or it can be required to transmit the selected data many times in order to satisfy all subscriptions. A transmit once mechanism (multicast) and optimized receive filter fine enough to quickly drop unwanted data is needed in order to preserve the workstation's CPU for application work.

It is also desirable to configure a system such that operators or engineers at assigned workstations are unable to access specific data due to security reasons or the fact that the data is outside their area of interest. If this is implemented in such a way that the workstation does not have knowledge of the existence of the specific data, it would not be possible for that workstation to request the data. This would greatly enhance a system administrator's or system engineer's ability to limit access to data within his controlling application. Operators would not have the ability to request system configuration status, SV engineers not see data relating to subsystems outside their area of interest, and real-time operator workstations could not request high-speed payload data which may cause them excessive CPU utilization problems.

SUMMARY OF THE INVENTION

A method for distributing data for one or more controlled devices having defined subsystems which generate data. The method includes the steps of partitioning and labeling the data to establish a set of defined data views, so that each data view contains data for a predetermined set of the subsystems; storing the data on a server node of a computer network; broadcasting the data containing a plurality of the data views from the server to at least one client node via the network using a multicast transmission method; and selectively processing in the client node only a predetermined set of the data views assigned to the client node and rejecting all other data views.

Upon a new client node connecting to the network, the system provides the server node with a directory of available information contained on the client node corresponding only to a set of server data views that the server can process. Similarly, upon a new client node connecting to the network, the system provides the client with a directory of available information contained on the server node corresponding only to a set of new client data views that the new client node can process. The broadcasted data view information advantageously contains data updates only, after each connected nodes has received an initial directory of available information.

According to one aspect of the invention, the server receives data from a plurality of controlled devices. Subsystems of the same type from different controlled devices are partitioned and labeled in accordance with the same data view.

The invention further includes a computer network system for distributing data for a set of controlled devices, where each device contains defined subsystems which generate data. Programming is provided for partitioning and labeling the data to establish a set of defined data views, so that each data view preferably contains data for a predetermined set of the subsystems. Programming is also provided for storing the data on a server node of a computer network and for broadcasting the data containing multiple data views from the server to at least one client node via the network using a multicast transmission method. Finally, additional programming is provided for selectively processing in the client node only a predetermined set of the data views assigned to the client node and rejecting all other data views.

According to one aspect, the system further includes programming responsive to a new client node connecting to the network for providing the server node with a directory of available information contained on the client node corresponding only to a set of server data views that the server can process. According to another aspect, the invention includes programming responsive to a new client node connecting to the network for providing the client with a directory of available information contained on the server node. The directory information thus provided corresponds only to a set of new client data views that the new client node can process. In a preferred embodiment, the broadcast data view information contains data updates only, after each connected node has received a directory of available information.

BRIEF DESCRIPTION OF THE DRAWINGS

There are presently shown in the drawings embodiments which are presently preferred, it being understood, however, that the invention is not so limited to the precise arrangements and instrumentalities shown, wherein:

FIG. 3 is a table illustrating subsystem/view assignments.

DETAILED DESCRIPTION OF THE INVENTION

The invention as disclosed herein finds particular application in large constellation satellite command and control systems. However, it is not limited in this regard and it will be readily appreciated by those skilled in the art that the inventive concepts applicable to many other types of similar complex systems. Accordingly, for the purposes of describing the invention herein, the term "device" is used describe a deployed system under control which may contain one or more subsystems (i.e. a satellite is a device containing power, thermal and payload subsystems). A collection of devices will be referred to as a "constellation". The software performing the controlling functions of the devices will be referred to as the "application".

The system performing the control of, data processing and data display of the constellation (i.e. a satellite ground station) consists of one or more nodes (workstations) distributing data from server nodes to client nodes via multicast and shared memory. Those skilled in the art will recognize that the transmission of data using multicast allows the server node to freely send data to all nodes within the system using a single network transmission. The rate at which individual clients accept and process data does not effect the server node. This solution uses multicast transmission for the distribution of device data.

The primary advantages of the invention as disclosed herein relate to data distribution extensibility and scalability. The method for distributing data allows application developers, system engineers and administrators to limit the access to data within their system based on node or physical site. Since this capability is configurable, the system may be tuned after the final application is deployed or may be expanded to add additional nodes when necessary. When a new node is brought into the system which does not require unlimited access to potentially sensitive data, that node, properly configured using the data distribution process described herein, will be limited to only that data which is required to perform its function.

According to a preferred embodiment of the invention, each device's data is partitioned by subsystem into labeled individually distributed data segments. A controlling application preferably has the capability to configure a specific node's ability to see the availability of, display and/or process these data segments. In this way the system allows a system administrator or system engineer to configure and control the flow of data within the system. According to a preferred embodiment, during the system design phase the administrator/engineer would determine which workstations and operators will receive which data (subsystems). The local workstation (or operator at that workstation) would thereafter be unable to reconfigure their software to accept a new or different set of subsystem's data which differs from that which they were initially configured for.

Figure 1:
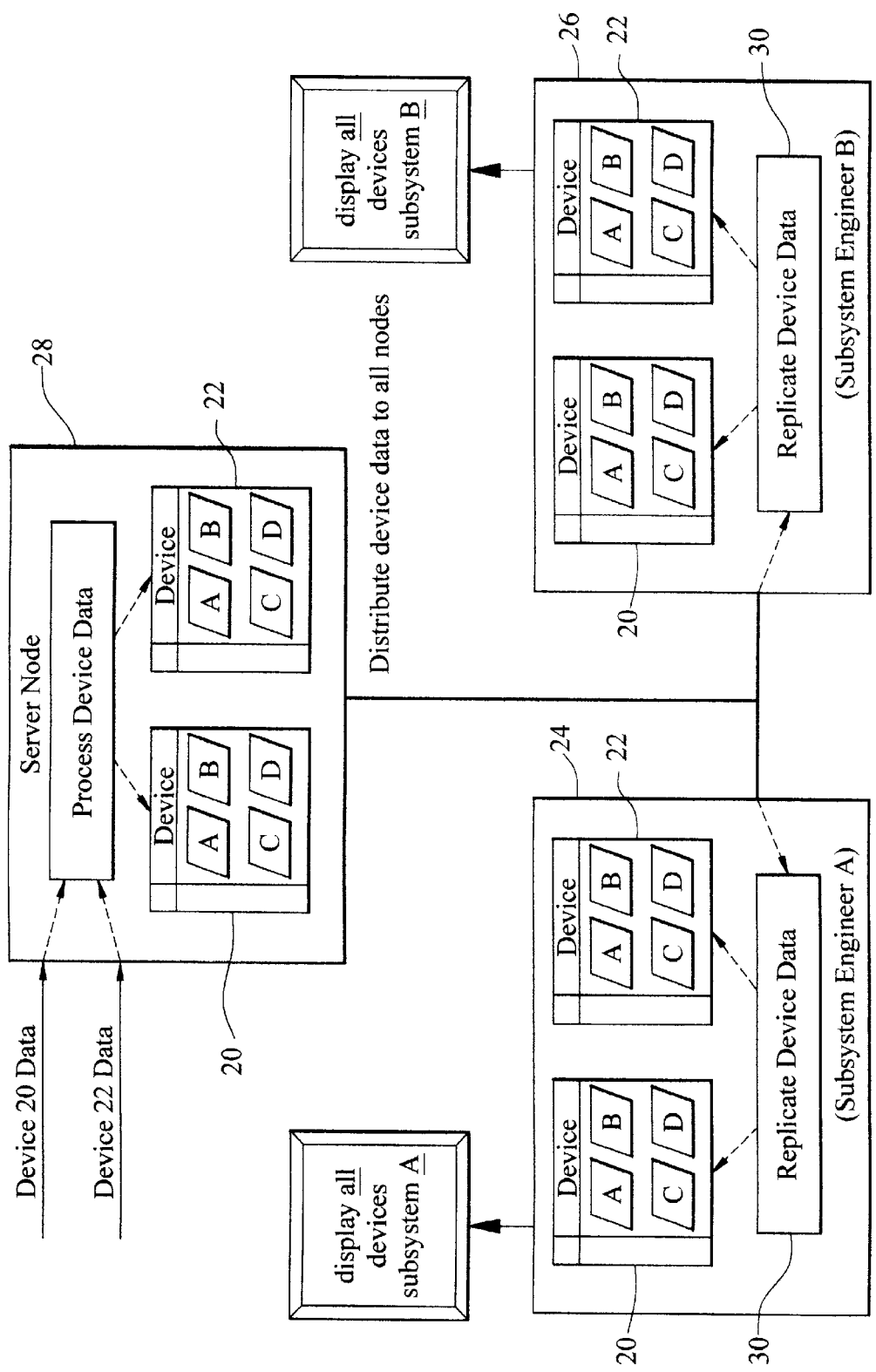
FIG. 1 is a block diagram showing data distributed to two nodes in a conventional manner.

FIG. 1 illustrates the need to configure a node's ability to see the availability of, display and/or process the data segments as defined above. FIG. 1 shows a conventional approach to data distribution of device subsystem data to engineering workstation nodes. Data for devices 20, 22 is conventionally distributed to two nodes 24, 26 where engineers are stationed and displaying the subsystem data for which they are responsible. In this case when a Subsystem Engineer A at node 24 wishes to see what data is available from the server node 28, he sees two devices 20, 22 each having four subsystems (A, B, C and D). When the engineer selects data from both devices, his node 24 ingests and replicates all subsystem data associated with those devices. In such circumstances, the node 24 consumes valuable CPU cycles unnecessarily due to the replication of superfluous data on this node. In particular, the engineer will typically wish to view only the data pertaining to the satellite subsystem they are responsible for, such as subsystem "A" in FIG. 1. The remaining data ingested by the node 24 must be either displayed or somehow filtered out. Either approach wastes valuable CPU cycles. Alternatively, a publish/subscribe method of data distribution would work in the scenario of FIG. 1, but in the case of many nodes requesting the same data, the server (or publisher) could be adversely effected. For example, the server may be required to transmit the data many times or may be stalled due to a subscriber's queue not being serviced.

Figure 2:
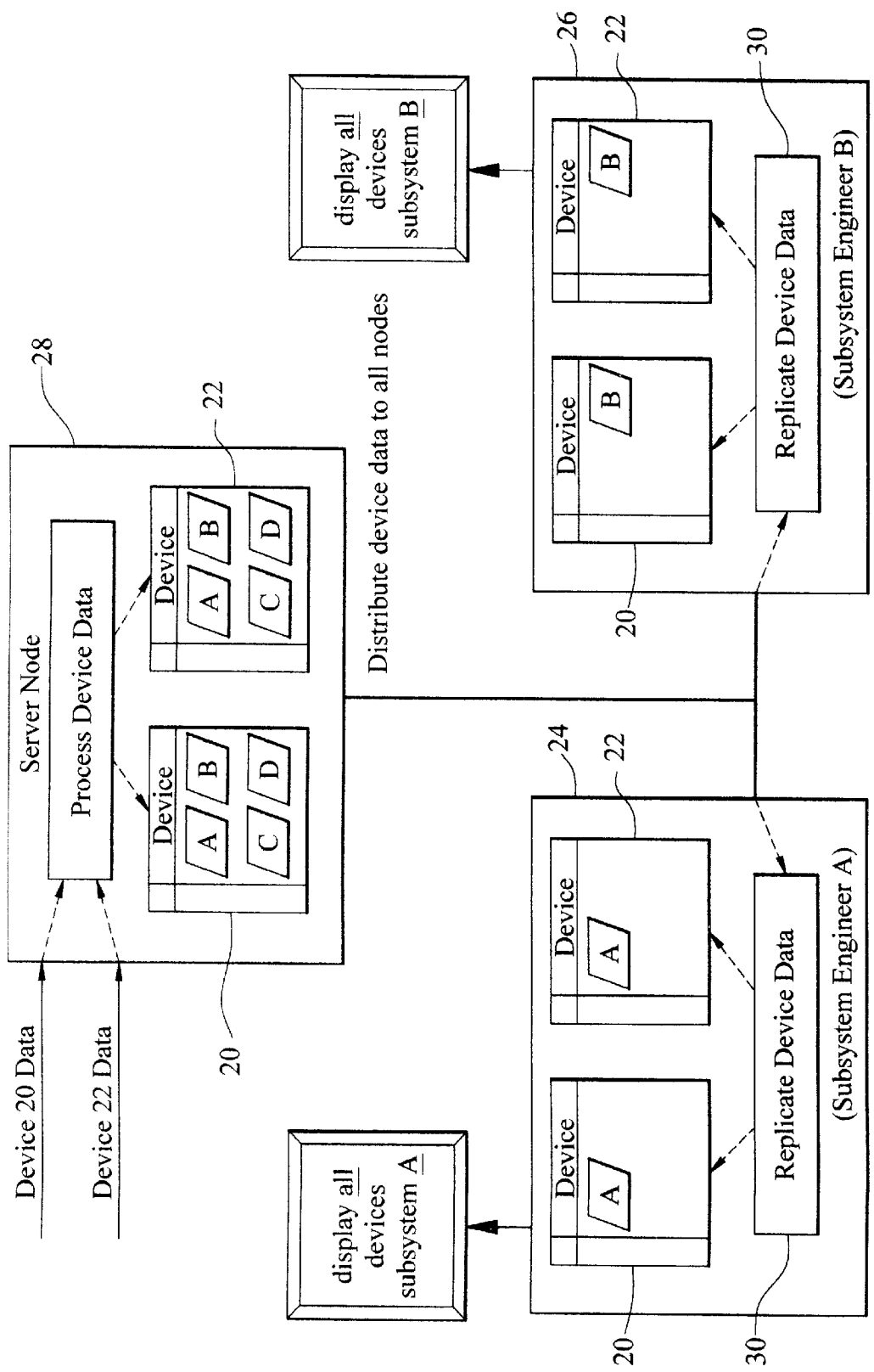
FIG. 2 is a block diagram showing data distributed to two nodes according to the invention.

FIG. 2 illustrates a preferred embodiment of the present invention. As shown therein, a particular workstation such as node 24 can be configured to see and accept only subsystem "A" data from all devices. When Subsystem Engineer A at node 24 wishes to see what data is available from the server node 28, he sees two devices 20, 20 22 containing only subsystem "A" data. When he requests device 20 data, his node accepts, replicates and processes subsystem "A" data and rejects all other subsystem's data (B, C and D) for device 20 which are not in view. Similarly, node 26 in FIG. 2 is configured to view subsystem B data only.

The replication service performed by the replicate device data application 30 shown in FIG. 2 quickly throws all unwanted data away and minimizes consumption of resources (CPU and memory) that would be used to replicate unwanted data. This capability allows the resources to be used for application data processing, more intense display capabilities, and to provide a greater margin for growth.

Further, the present invention relies on data being tagged with a view tag or identifier. The view tag for a particular data set may be changed by a user when the system is quiescent, thus altering the distribution and acceptance of that data set on workstations throughout the system. This is done without altering the data's contents so that application software will not be effected. Similarly, each mode's views of the other modes in the system can be changed by a user. This capability also allows system engineers and administrators to "tune" the system's data flow and potentially balance the load between workstations, without modifying any of the software of the network system.

In order to achieve the result shown in FIG. 2, a device's data structures are defined in advance and can be partitioned into subsystem groups (i.e. a satellite's subsystems include power, thermal, payload, etc.). In this solution, files are generated for each subsystem describing that subsystem's measurands (telemetry values) and their associated attributes (alarm limits, conversion coefficients, etc.). This file describing a device's subsystem is preferably given a numeric view value. It will be appreciated that text values can also be used for this purpose if they are hashed or translated to numeric values. Each of the various subsystems that make up a device are given unique view values. FIG. 3 shows an example of subsystem/view assignments according to a preferred embodiment.

The logical assignment of various types of data to different views allows system administrators/engineers to configure specific nodes to be "in view" of selected data only. According to a preferred embodiment, this process of selecting which nodes are in view of various types of data from particular subsystems can be accomplished by simply varying a configuration file which defines what each node can view. The replicate device data application 30 will cause those nodes not assigned to be in-view of selected data to not accept or process that data.

According to a preferred embodiment, views can be configured (enabled or disabled) at the node level as well as the site level. As used herein, the term "site" refers to physically remote grouped sets of nodes connected via a Wide Area Network (WAN) or modem. Thus, in the example shown in FIGS. 2 and 3, the system would be configured so that client node 24 sees server node 28 data on view 1, and client node 26 sees server node 28 data on view 2. By comparison, server node 28 can be configured to see client node 24 data on views 1, 2, 3 and 4 and to see client node 26 data on views 1, 2, 3 and 4.

Figure 5:
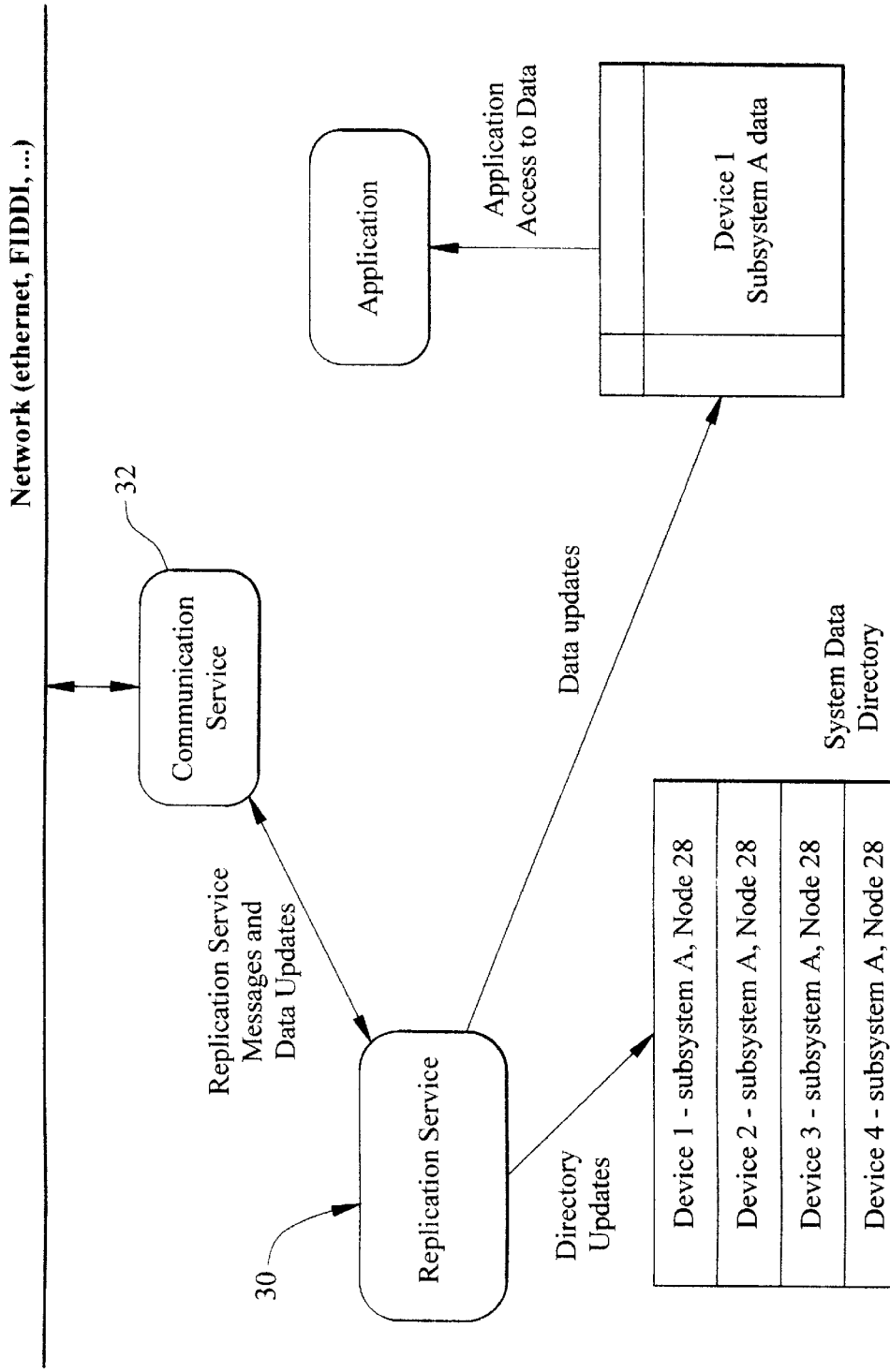
FIG. 5 is a block diagram showing the architecture and data structures used by the replication service on client node 24.

FIG. 5 shows the architecture and data structures used by the replication service 30 on client node 24 from the example above according to a preferred embodiment. The replication service 30 is a single process providing users and local applications a directory of data available throughout the system. The replication service 30 stores in its directory 36 the names of the available data and the node from which it is being served. An example of a client directory would be as follows:

| Data | Server Node |
|---|---|
| device 1 - subsystem A | node 28 |
| device 2 - subsystem A | node 28 |
| device 3 - subsystem A | node 28 |
| device 4 - subsystem A | node 28 |

This table reflects the directory of node 24 after initialization. In a preferred embodiment, multicast communication protocols can be used to transmit subsequent changes to the directory 36 so as to minimize network traffic.

Once the directory of valid available data has been established, for example on client node 24, the replication service 30 will now start accepting and installing updates associated with data it can view only to the extent that such data has been requested by a user or application on that node. If an application or a user at client node 24 requests data from device#1/subsystem A, the replication service will start maintaining that data on behalf of the application/user.

It should be noted that an application or a user on client node 24 will be unable to successfully request data from a subsystem for which it has not been configured by a system administrator. If an application on node 24 were to request data from device #1/subsystem B, for example, such data would not exist in its workstation's data directory and the request would therefor be rejected. In this case the data does not appear to exist with respect to the local workstation 24.

Further, it should be noted that an application or user at node 24 preferably does not control its view properties. Instead, a system administrator or ranking engineer is responsible for configuring the data distribution of the system. This prevents both application software and operators from requesting data that they are not supposed to view or process. This capability allows the system's designers and run-time management staff to maintain control of the system's data. Thus, the invention offers a useful security feature. Users cannot step up to any workstation and gain access to any data which the overall network is otherwise capable of producing. Workstations are limited (in a predetermined fashion) in the data they are able to accept and process. For example, a particular set or workstations may be allocated to high level engineers or analysts. Those workstations can be limited to high level status data by assigning that status data to a view which is accepted on that workstation. Other more sensitive data on other views is rejected by the workstation With the above configuration, client node 24 is prevented from viewing subsystems B, C, and D on views 2, 3, and 4 respectively. The foregoing is preferably accomplished at initialization and at run time by the inter-nodal exchange of information between the replication device on client node 24 and the server node 28 as hereinafter described relative to FIG. 4.

Figure 4:
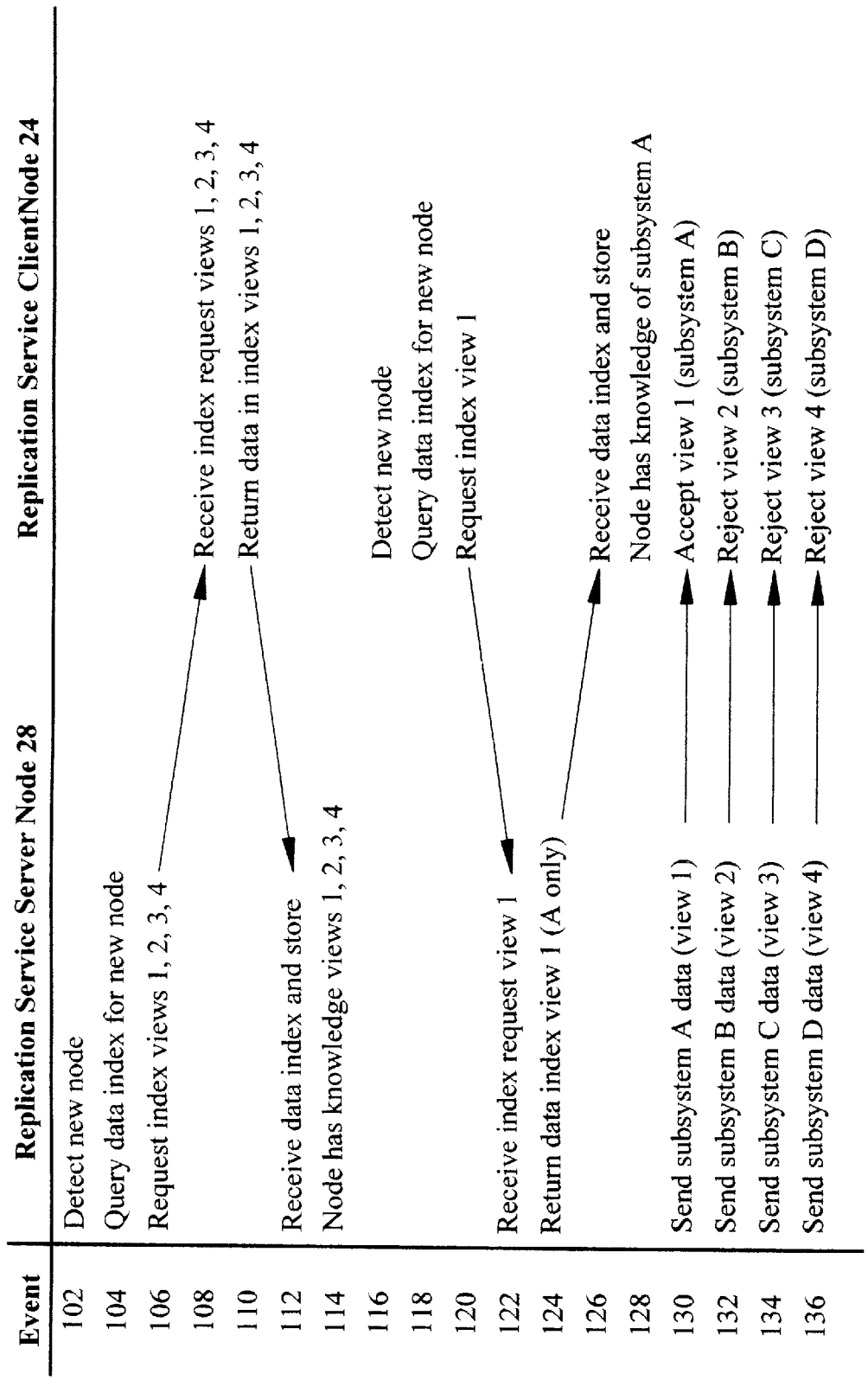
FIG. 4 is an event trace diagram illustrating the operation of the invention according to a preferred embodiment.

FIG. 4 shows the event trace when a client node 24, 26 initially communicates with server node 28. In accordance with FIG. 2, subsystem data that is distributed throughout the system is tagged with its corresponding view 1, 2, 3, and 4 and source node, which in this case would be server node 28. The data that is distributed has a header which contains a view tag. The header is provided for the replication service to determine the device and subsystem to which the specific data item belongs. The view tag is a 32 bit long word with a bit set corresponding to the view for that data. In a preferred embodiment, the bit mask can be compared to the view tag for the node which it originated from. The result of a bitwise "and" function applied to the view tag and the bit mask associated with the server node results in a zero or non-zero output. If zero, then the data is rejected and the data cannot be viewed. If the output is non-zero, then the data is accepted. In this way, data received by each node 24, 26 is tested to determine if the specified view is valid for the corresponding source node. If it is valid, it is replicated on the node. If it is not valid, it is dropped.

Referring to FIGS. 2, 4 and 5, it can be seen that in event 102, server node 28 detects a new node 24 in the system. This is done either by a communication service 32 notifying the replication service 30 of a new node in the system or by the replication service itself sending messages alerting all other participating nodes in the system that there is a new replication service on-line. In event 104, server node 28 determines the views which itself and the client node 24 can communicate data over. This data is retrieved from a typical text configuration file located either local to the server or on an FTP server. As an example the server node 28 can "see" views 1, 2, 3 and 4 from the client node 24 while the client node 24 can only see view 1 from the server node 28. In a preferred embodiment, there is a single version of the configuration file which contains information instructing each individual node in the system how (which data views) they can exchange with each other. The configuration file can be replicated as necessary on additional workstations, but can only be changed by a system administrator. Any changes are propagated to each replicated version of the configuration file residing elsewhere in the system.

The configuration file is a simple text file describing the data interaction of clients and servers throughout the system. FIG. 3 described four views within the system. Views 1, 2, 3 and 4 correspond to device subsystems' A, B, C and D. As stated above server node 28 can see views 1, 2, 3 and 4 from the client node 24 while the client node 24 can only see view 1 from the server node 28. This configuration is accomplished in the configuration file by:

| View 1: | node_28 sees node_24 |
|---|---|
|  | node 24 sees node_28 |
| View 2: | node_28 sees node_24 |
| View 3: | node_28 sees node_24 |
| View 4: | node_28 sees node_24 |

In the above view configuration file example 'view 1' contains two entries; 1) node 28 is able to view data from node 24; 2) node 24 is able to view data from node 28. The statements for views 2, 3 and 4 contains a single entry; 1) node 28 is able to view data from node 24 (the absence of a statement "node_24 sees node_28" indicates that node 24 is limited to what data can be received from node 28).

In event 106, the server node 28 sends a message to the replication service on node 24 requesting its "directory" of available data. This message contains a view bit mask with bits 1, 2, 3 and 4 set. This is the method by which replication services notify each other of the views in which they can exchange.

Figure 7:
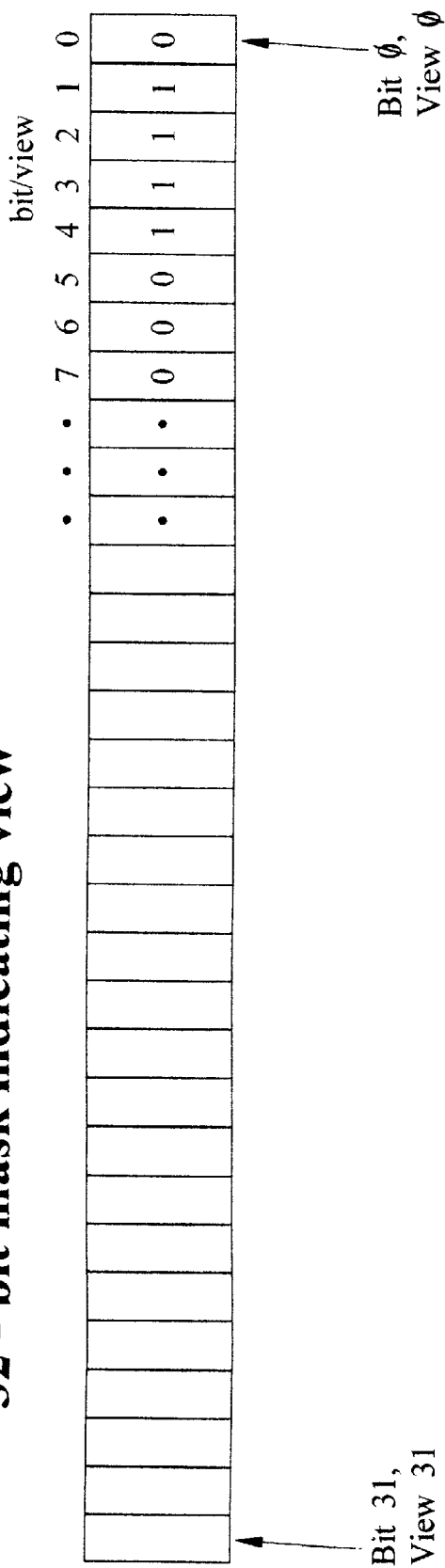
FIG. 7 is an example of a bit mask.

Referring to FIG. 4, when steps 106, 108, 110 and 112 occur, the replication service 30 on nodes 24 and 28 preferably exchange the views in which they may communicate by transmitting bit masks to each other. A long word contains 32 bits of information. In a preferred embodiment of this invention, each bit corresponds to a specific view as shown in FIG. 7. For instance bit 0 indicates view 0, bit 1 indicates view 1, and so on. When replication servers initialize they exchange view information indicating the views in which they may communicate. In the examples given above, node 28 "sees" node 24 on view 1, 2, 3 and 4. This translates to a bit mask with bits 1, 2, 3 and 4 set (00000000000000000000000000011110 binary or 0x0000001 e hex). Similarly node 24 "sees" node 28 on view 1. This translates to a mask with bit 1 set (00000000000000000000000000000010 binary or 0x00000002 hex). The bit mask as described herein is one approach to defining views. Those skilled in the art will appreciate that there are a variety of other ways in which such data can be encoded and the invention is not intended to be limited to the specific implementation described.

In event 108, client node 24 receives the message from the server node 28 requesting its data directory. It determines the requested views by sensing the set bit of the view mask. In event 110, client node 24 looks-up the data available on its node that is labeled as either view 1, 2, 3 or 4 and sends that information to the requesting server node 28.

In event 112, server node 28 receives client node 24's data directory and stores it. In event 114, server node 24 now has knowledge of the client node 24's data with respect to views 1, 2, 3 and 4. This directory of data will be made available to users and applications on the node.

In event 116, client node 24 now detects server node 28's presence. In event 118, as in event 104 above, client node 24 determines it can exchange only view 1 data with server node 28. In event 120, client node 24 transmits a message to the server node 28 requesting a directory of view 1 data (the view mask has bit 1 set only).

In event 122, server node 28 receives the directory request message and determines the client node 24 can see its view 1 only. In event 1 24, server node 28 packages a directory of its available data corresponding to view 1 and sends it to client node 24.

In event 126, client node 24 receives and stores server node 24's view 1 directory of data. In event 128, client node 24 now has knowledge of view 1 data only from the server node. Views 2, 3 and 4 are unknown to the client node 24. Therefore, users and applications on the client node 24 are unable to request or view data labeled as views 2, 3 and 4 from the server node.

In event 130, subsequent view 1 data updates from the server node are accepted. In event 132, subsequent view 2 data updates from the server are rejected (data source is unknown). In event 134, subsequent view 3 data updates from the server are rejected (data source is unknown). In event 136, subsequent view 4 data updates from the server are rejected (data source is unknown).

FIG. 4 illustrates that when a client node 24 is initially connected to the network, it preferably follows an initialization procedure which includes receiving a complete directory of information from the server 28 corresponding to the particular data views that the client can process. Similarly, the client provides the server with any information it has concerning the data views that the server can process. Subsequent to this initialization process however, the system preferably limits broadcasted data to include only update information corresponding to the existing data directory stored in each node, rather than continually re-broadcasting the entire directory each time it a data value may change. Broadcasted data can be transmitted over the network using well known techniques such as multicast or other suitable network communication methods.

It should be noted that with the present system, the data views assigned to each node can be node source sensitive. In particular, a node's configuration file can be set up so that subsystem A data is in view when sent from a first node, but not when subsystem A data is sent from a second node. The foregoing capability gives a very flexible and precise means for controlling the flow of data within a high data volume network system.

Figure 6:
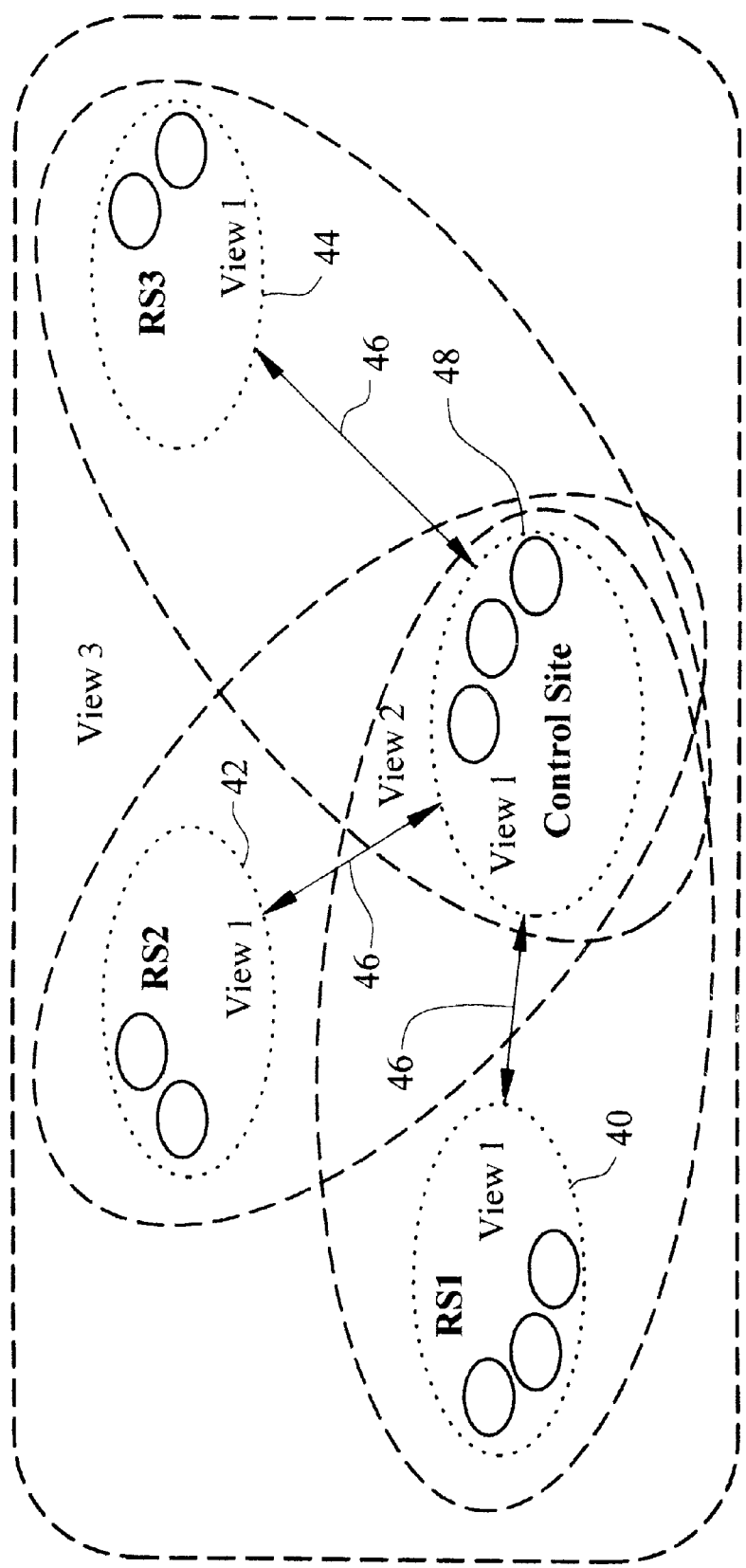
FIG. 6 is an example of a wide area network topology in which the invention is used.

Many distributed applications today are not only distributed over a Local Area Network (LAN), but are also distributed over one or more Wide Area Networks (WANs). WAN applications are very sensitive to sharing data between physical sites. Some data is site oriented while other data is system oriented. FIG. 6 shows an example WAN topology for a satellite ground station application. RS nodes 40, 42, 44 are remote sites providing the physical connection to a satellite constellation. The WANs 46 are then used to transmit the raw satellite telemetry back to the control site 48. Likewise, the control site sends schedule and configuration data to the remote sites 40, 42, 44.

As shown in the example of FIG. 6, view 1 data is site oriented configuration and control information which is not shared between any sites in the system. Remote site nodes 40, 42, 44 and control site 48 do not share any view 1 data. View 2 data containing schedule, site control and satellite telemetry data is shared between the individual remote sites 40, 42, 44 and the control site 48. However, the remote site nodes 40, 42, and 44 do not share any view 2 data from one remote site to another. View 3 data containing system state and system configuration data is shared among all nodes 40, 42, 44, 48 in the system. Thus, the data distribution process according to the present invention allows a clear and exact method of isolating various data types between nodes and sites within the system.

The nodes referred to herein are preferably comprised of a computer including a central processing unit (CPU), one or more memory devices and associated circuitry. Network interface cards are preferably provided for permitting each node to communicate with a computer network. The node also preferably includes at least one user interface display unit such as a video data terminal (VDT) operatively connected thereto. The CPU can be comprised of any suitable microprocessor or other electronic processing unit, as is well known to those skilled in the art. An example of such a CPU would include the Pentium II or Pentium III brand microprocessor available from Intel Corporation or any similar microprocessor. An interface device, such as mouse, may also be provided with the system, but is not necessary for operation of the invention as described herein. The various hardware requirements for the computer nodes as described herein can generally be satisfied by any one of many commercially available high speed personal computers offered by manufacturers such as International Business Machines Corporation (IBM), Compaq, Hewlett Packard, or Apple Computers.

The operating system for each of the nodes 24, 26, 28 can be Unix bases or may be one of the Windows family of operating systems, such as Windows NT or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above.

The system as describe herein is preferably supported by a communications infrastructure capable of transmitting messages between replication services. This infrastructure can be TCP/IP, COM/DCOM, or any other suitable third party software bus capable of delivering messages between processes on different nodes within the system. The nodes (workstations) participating in the system may be running any operating system which supports shared memory and interprocess communications. The node must have sufficient memory to perform the tasks relevant to the replication of data and the storage of the systems data directory.

While the foregoing specification illustrates and describes the preferred embodiments of this invention, it is to be understood that the invention is not limited to the precise construction herein disclosed. The invention can be embodied in other specific forms, such as described above, without departing from the spirit or essential attributes. Accordingly, reference should be made to the following claims, rather than to the foregoing specification, as indicating the scope of the invention.

What is claimed is:

1. A method for distributing data for a controlled device having a plurality of defined subsystems comprising the steps of:
    partitioning and labeling the data in accordance with a set of defined data views, each data view containing data for a predetermined set of said subsystems;
    storing said data on a server node of a computer network;
    broadcasting said data containing a plurality of said data views from said server to at least one client node via said network using a multicast transmission method; and
    selectively processing in said client node only a predetermined set of said data views assigned to said client node and rejecting all other data views.

2. The method according to claim 1 further comprising the step of:
    upon a new client node connecting to said network, providing said server node with a directory of available information contained on said client node corresponding only to a set of server data views that said server can process.

3. The method according to claim 1 further comprising the step of:
    upon a new client node connecting to said network, providing said client with a directory of available information contained on said server node corresponding only to a set of new client data views that said new client node can process.

4. The method according to claim 3 wherein said broadcast data view information contains data updates only after each connected nodes has received a directory of available information.

5. The method according to claim 1 wherein said server receives data from a plurality of controlled devices and subsystems of the same type from different controlled devices are partitioned and labeled in accordance with the same data view.

6. The method according to claim 1 wherein said processing performed by said client node includes re-transmitting selected data views received from said server over a wide area network to a remote site for further processing of said data.

7. A computer network system for distributing data for a controlled device having a plurality of defined subsystems comprising:
    means for partitioning and labeling said data to establish a set of defined data views, each data view containing data for a predetermined set of said subsystems;
    means for storing said data on a server node of a computer network;
    means for broadcasting said data containing a plurality of said data views from said server to at least one client node via said network using a multicast transmission method; and
    means for selectively processing in said client node only a predetermined set of said data views assigned to said client node and rejecting all other data views.

8. The system according to claim 7 further comprising:
    means responsive to a new client node connecting to said network for providing said server node with a directory of available information contained on said client node corresponding only to a set of server data views that said server can process.

9. The system according to claim 7 further comprising:
    means responsive to a new client node connecting to said network for providing said client with a directory of available information contained on said server node corresponding only to a set of new client data views that said new client node can process.

10. The system according to claim 9 wherein said broadcast data view information contains data updates only after each connected nodes has received a directory of available information.

11. The system according to claim 7 wherein said server receives data from a plurality of controlled devices and subsystems of the same type from different controlled devices are partitioned and labeled in accordance with the same data view.

12. The system according to claim 7 wherein said processing performed by said client node includes re-transmitting selected data views received from said server over a wide area network to a remote site for further processing of said data.

13. A method for distributing data for a plurality of controlled devices forming a constellation in which each device has a plurality of defined subsystems, comprising the steps of:

partitioning and labeling said data to establish a set of defined data views, each data view exclusively containing data for a predetermined set of said subsystems of the same type from different controlled devices;

storing said data on a server node of a computer network;

broadcasting data updates for a plurality of said data views from said server to each of a plurality of client nodes via said network using a multicast transmission method;

selectively processing in each of said client nodes only a predetermined set of said data in accordance with data views assignments established for each said client node, and rejecting all other data received at said node; and reconfiguring said data view assignments for said nodes by a user as necessary for selectively controlling which nodes receive selected data in accordance with said data views.

14. The method according to claim 13 wherein said data view assignments for said nodes are contained in a network configuration file.

15. The method according to claim 13 wherein data view assignments for each node are source node sensitive whereby identical data views from different nodes are processed differently from one another.

16. The method according to claim 13 wherein reconfiguring said data view assignments is performed by a user without modifying any programming of any application of said computer network.

* * * * *